United States Patent

Baylocq et al.

[11] Patent Number: 5,899,945
[45] Date of Patent: May 4, 1999

[54] ATTITUDE CONTROL AND NAVIGATION SYSTEM FOR HIGH RESOLUTION IMAGING

[75] Inventors: Michel B. Baylocq, Menlo Park; Nobuo Furumoto, Sunnyvale; Joseph R. Ravella, Mountain View; John Savides, Los Altos Hills, all of Calif.

[73] Assignee: Space Systems/Loral, Inc., Palo Alto, Calif.

[21] Appl. No.: 08/926,266

[22] Filed: Sep. 5, 1997

Related U.S. Application Data

[63] Continuation of application No. 08/423,749, Apr. 17, 1995, abandoned.

[51] Int. Cl.⁶ .................................... G06F 17/40
[52] U.S. Cl. ..................... 701/4; 701/13; 701/213; 701/223; 348/143; 348/144; 342/357
[58] Field of Search .................... 701/3, 4, 13, 207, 701/213, 215, 223, 224; 348/117, 143, 144; 342/357, 457; 244/164, 171

[56] References Cited

U.S. PATENT DOCUMENTS

| 3,567,155 | 3/1971 | Gatlin | 244/1 |
|---|---|---|---|
| 3,984,071 | 10/1976 | Fleming | 244/169 |
| 4,682,300 | 7/1987 | Seto et al. | 364/571.02 |
| 4,688,091 | 8/1987 | Kamel et al. | 382/103 |
| 4,688,092 | 8/1987 | Kamel et al. | 348/147 |
| 4,837,699 | 6/1989 | Smay et al. | 364/434 |
| 5,027,199 | 6/1991 | Suzuki | 348/50 |
| 5,101,356 | 3/1992 | Timothy et al. | 364/449 |
| 5,134,473 | 7/1992 | Nagura | 348/144 |
| 5,204,818 | 4/1993 | Landecker et al. | 364/459 |
| 5,353,055 | 10/1994 | Hiramatsu | 348/145 |
| 5,543,804 | 8/1996 | Buchler et al. | 342/357 |

FOREIGN PATENT DOCUMENTS

| 0 361 297 | 4/1990 | European Pat. Off. |
| 0 383 114 | 8/1990 | European Pat. Off. |

OTHER PUBLICATIONS

Martin–Neira et al., "Attitude Determination with GPS: Experimental Results", IEEE Sep. 1990, pp. 24–29.
Rosborough et al., "Precise AVARR Image Navigation", IEEE May 1994, pp. 644–657.
Brock et al., "GPS Attitude and Orbit Determination for Space". Presented at the ION GPS–94 Conference, Salt Lake City, UT, Sep. 20–23, 1994, pp. 1–8.

Primary Examiner—Tan Q. Nguyen
Attorney, Agent, or Firm—Perman & Green, LLP

[57] ABSTRACT

The system consists of a satellite position and attitude reference system utilizing Global Positioning System data, an on board computer to analyze and generate position and attitude dependent instructions, an attitude control system to adjust the attitude of the space craft in response to instructions from the computer, an imaging system responsive to the computer to generate image data and transmit it, and a ground based, image data receiver and post processing system to assemble the image data, code the data and compile sequential images into a mosaic depicting the target. The on board computer delays the generation of attitude control instructions, during the process of capturing image data, in order to avoid image distortion due to attitude adjustment movement of the spacecraft.

2 Claims, 3 Drawing Sheets

ATTITUDE CONTROL AND NAVIGATION SYSTEM FOR HIGH RESOLUTION IMAGING

This application is a continuation of application Ser. No. 08/423,749 filed on Apr. 17, 1995, now abandoned.

BACKGROUND OF THE INVENTION

In a high resolution imaging system which is based on orbiting satellites, the quality of the image depends on the systems ability to point to the target and the stability of the satellite platform during the relatively short duration image generation process. The image consists of a swath across the target and must be assembled as a mosaic by the image processing software. As illustrated in FIG. 2, a constellation of satellites orbiting in the same orbital plane can be used to provide a complete scan of the target area. The optical system on each satellite is adjusted by attitude control or other means to scan overlapping swaths. The pointing function requires instantaneous position and attitude data which are, in prior art systems, provided through the use of precision star and earth sensors requiring expensive and complex systems. Because of the relative motion between the target and the imaging satellite, the image generation process is of short duration in the range of between 40 to 60 seconds. During this process it is desirable to hold the aimed optical system steady to prevent smearing, distortion or other image problems. A great deal of effort has been invested to maintain the positional stability of the satellite platform resulting in increased complexity in the associated attitude control system.

An attitude control system of the prior art used for satellite imaging is described in U.S. Pat. No. 4,837,699. In this system, space craft attitude is adjusted by activating axial and radial thrusters in response to an attitude correction signal. The attitude error is sensed by reference to sensors monitoring the relative position of the sun and earth. The use of sun sensors or other celestial means to monitor attitude is complex and costly. The attitude is adjusted to its mission orientation in which the imaging system is pointed at its predetermined target and is maintained in this orientation during orbital flight. During flight the satellite is subject to motions induced by solar torques, on board mechanisms or other sources and the attitude control system must continuously monitor and adjust attitude.

Once the image data is captured, it is transmitted in raw form to a receiving station where it is processed, enhanced and coded for assembly. Complex computer algorithms allow the assembly of the processed images into a mosaic depicting the target area for analysis.

Recent advances in these algorithms allow compensation for pointing inaccuracies and optical platform movement. Such algorithms are described in U.S. Pat. No. 4,688,092.

Image quality is effected by the relative movement between the imaging system and the target. Accordingly the prior art has focused on stabilization through attitude control. Current tolerances for pointing accuracy and movement accommodation are demanding and are a function of the image post-processing as well as the optical payload field of view and resolution. It is the purpose of this invention to adapt the advanced distortion reducing algorithms to allow wider tolerance in pointing accuracy and stability and then to use these increased tolerances to simplify and lower the cost of the system.

SUMMARY OF THE INVENTION

The system of this invention relies on powerful image processing algorithms to filter or compensate for distortions due to ground motion and platform attitude oscillations. Through the use of landmark recognition, the assembly of the mosaic becomes less reliant on precise data and eliminates the need for continuous star and earth sensing. This increases the range of tolerance allowed for the pointing system. A Global Positioning System receiver is used as an attitude reference to determine the instantaneous attitude of the satellite and through the employment of a simple three axis control system, the attitude of the satellite can be adjusted to point the imaging system at the target. This pointing system is sufficiently accurate to allow the image processing software to assemble the images utilizing landmark recognition.

Once the image system is pointed at the target within acceptable tolerances, it is found that, attitude oscillations caused by the attitude control system is the source of the most significant distortion. In the system of this invention means are provided to deactivate the attitude control system to avoid disturbances during the image generating process. Any distortions due to drift during imaging are compensated for by the post processing software and by enlarging the field of view to reduce the effect of motion.

The system consists of a satellite position and attitude reference system utilizing Global Positioning System data, an on board computer to analyze and generate position and attitude dependent instructions, an attitude control system to adjust the attitude of the space craft in response to instructions from the computer, an imaging system responsive to the computer to generate image data and transmit it, and a ground based, image data receiver and post processing system to assemble the image data, code the data and compile sequential images into a mosaic depicting the target. The on board computer delays the generation of attitude control instructions, during the process of capturing image data, in order to avoid image distortion due to attitude adjustment movement of the spacecraft.

DESCRIPTION OF THE DRAWINGS

The preferred embodiment of the invention is described below with reference to the drawing attached to this application in which.

DESCRIPTION OF THE PREFERRED EMBODIMENT

Figure 1:
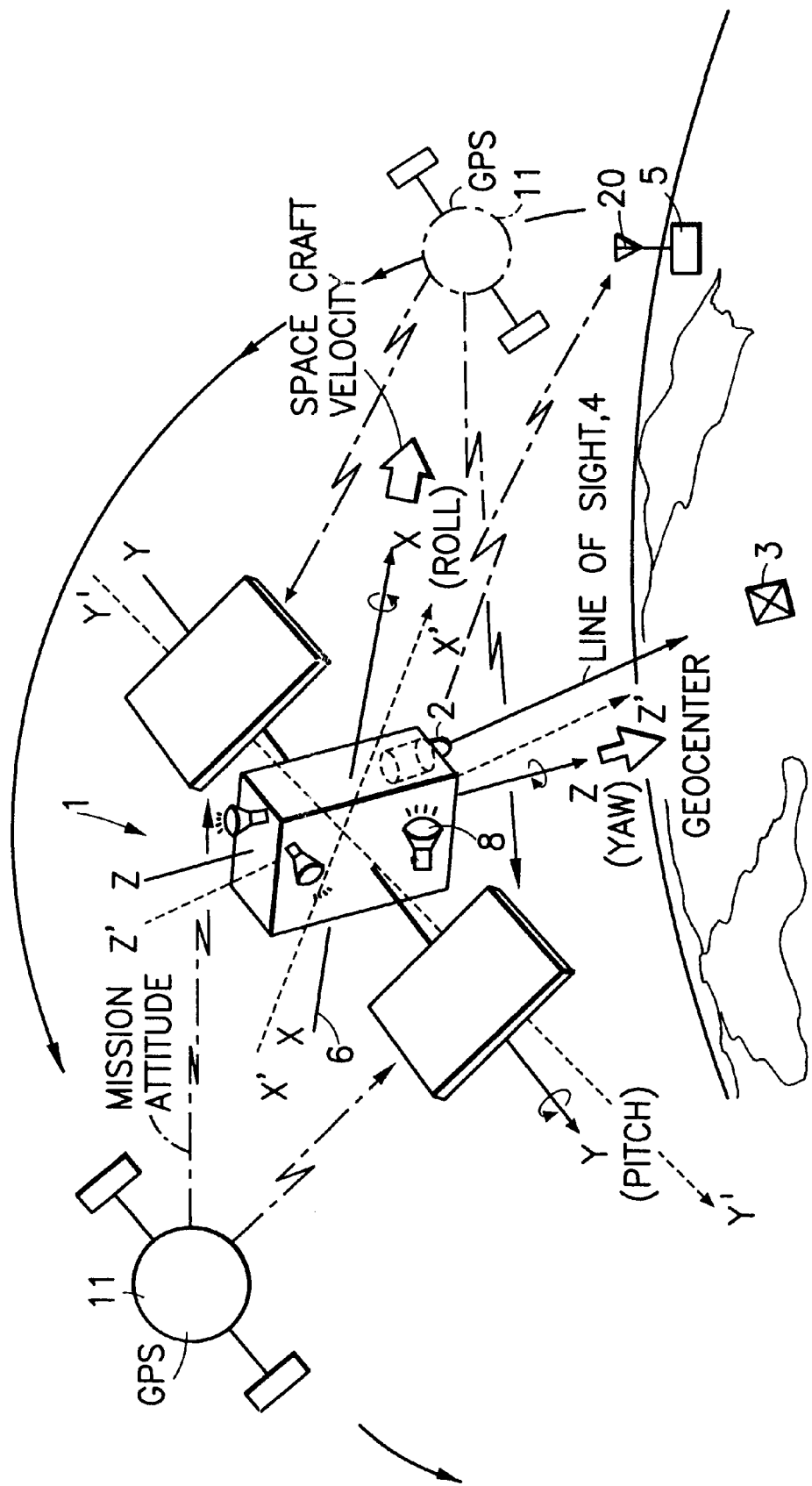
FIG. 1 is an illustration of the orbiting space craft of this invention and its components.
Figure 2:
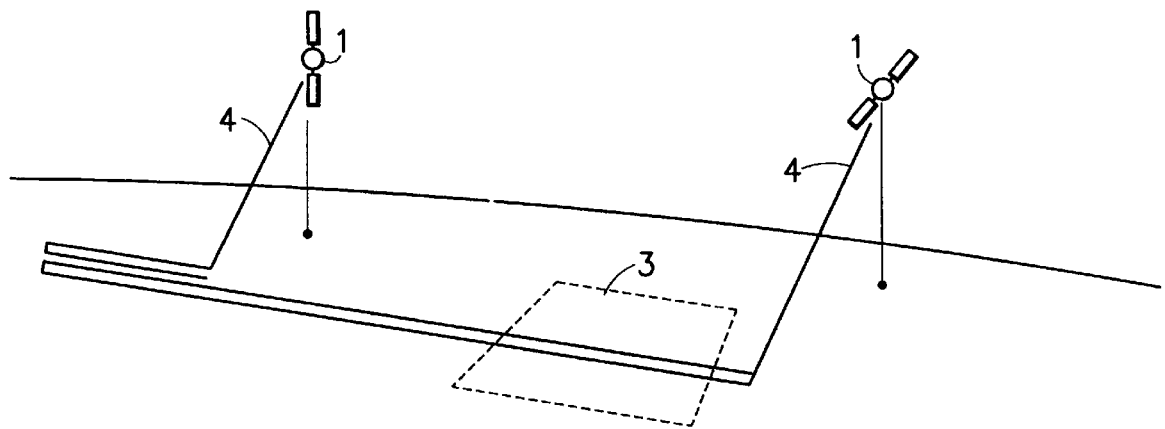
FIG. 2 is an illustration of the orbiting space craft of this invention showing the imaging process.
Figure 4:
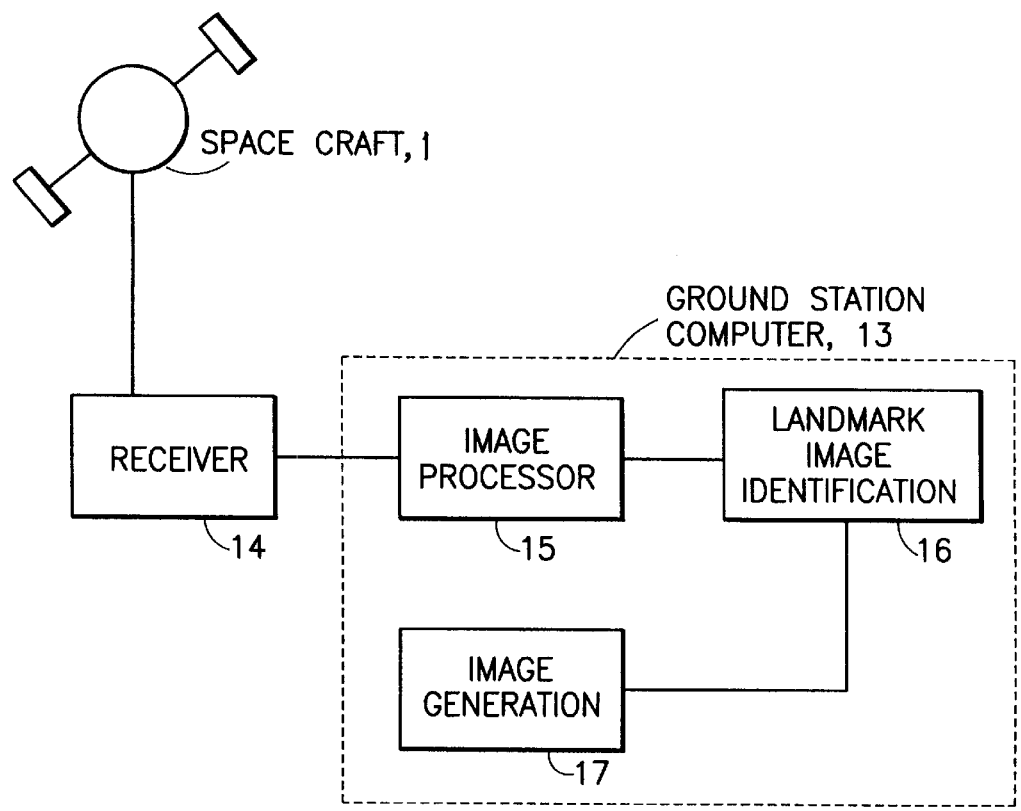
FIG. 4 is a block diagram of the ground control system of this invention.
Figure 3:
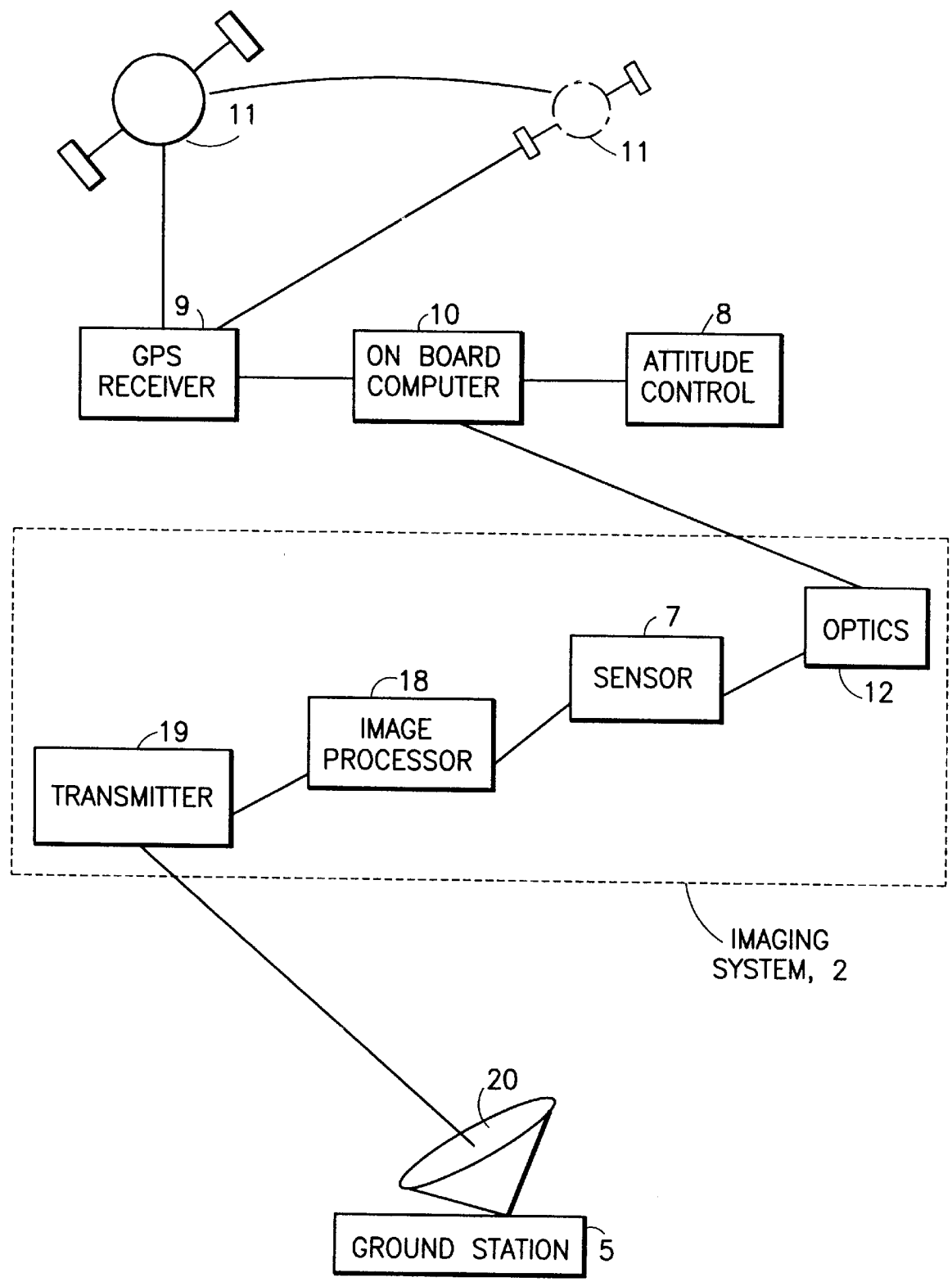
FIG. 3 is a block diagram of the space craft control system of this invention.

The space craft 1 of this invention, shown in FIG. 1, is designed to carry an imaging system 2 to capture data from a target 3 and transmit the data to a ground receiving station 5 for processing. In order to accomplish its mission the imaging space craft 1 is placed in orbit in a predetermined path 6, as shown in FIG. 2, consistent with the geographical location of the target. The basic components of the system involve the on board system comprising: imaging system 2, an attitude control system 8, a position and attitude data receiver 9, and an on board computer 10. The output of the imaging system 2 is transmitted to the ground receiving station 5 which includes: receiver 14, image processor 15, location identifier 16, and image generator 17.

Central to the operation of the system is the on board computer 10 which, after launch and orbit has been achieved, is adapted to control the attitude of the space craft and to monitor its position. This is accomplished by installing the capability of receiving actual position and attitude data from a remote reference system and comparing such data to predetermined data. The computer 10 is then able to generate attitude control instructions to adjust the position of the space craft to its mission attitude i.e. the image system 2 is pointed at the target.

The system of this invention uses as its remote reference system the Global Positioning system (GPS) currently installed in space for use by ships and planes for monitoring their position. The GPS is a constellation of orbiting satellites 11 which transmit timed signals indicative of their position in the constellation. Receiving stations on the vehicle can identify the signals and location of multiple satellites and, using the timing of the transmission, establish the position of the receiving station with considerable accuracy and simplicity.

The use of the GPS for space craft navigation and attitude control has been suggested in the prior art, in particular in "GPS Attitude and Orbit Determination for Space", Brock et al, ION GPS Conference, Sep. 20–23, 1994, a suitable GPS receiver for deployment in space is described. In the system of the subject invention, each GPS signal, in addition to carrying the identity of the specific GPS satellite 11 from which the signal emanates, also carries the time of transmission of the GPS signal from each of the respective GPS satellites 11. Each GPS receiver 9 includes well-known computational circuitry which, upon observation of the time delays of the respective GPS signals from the respective satellites, computes its own position. The position and attitude data receiver 9 of the space craft 1 is constructed with multiple antennae 12 in fixed location relative to the space craft reference coordinates. The pattern of relative receiving times of each antenna in the group enables calculation of the relative position of each antenna. From this information the instantaneous attitude of the space craft 1 can be determined. In this manner the data relative to actual position and attitude can be collected and sent to the computer 10.

Attitude control is accomplished through reference to the orthogonal axis x, y, z as shown in FIG. 1. The nominal orientation of these axis are with respect to a plane defined by a line connecting the earth's center of mass with the center of mass of the space craft and the direction of orbital movement, i.e.. the orbital plane. A mission attitude x', y', z' is established in which the line of sight 4 of the image data sensor 7 is directed at the target during image data collection.

The attitude control system 8 is an active system employing reaction jets to generate incremental movement of the space craft to adjust roll, yaw, and pitch identified with the reference axis as shown in FIG. 1. This three axis control system is well established and described in the prior art, such as U.S. Pat. Nos. 3,567,155 and 3,984,071. The attitude control system 8 is activated by adjustment signals generated by computer 10.

Imaging system 2 can utilize any suitable optical apparatus 12 such as a telescope that can provide image data to the photosensitive sensor element 7. The sensor 7 converts the image data collected into electrical signals which are processed by image processor 18 for transmission by imaging transmitter 19 to the receiving station 5. Although the parameters of the imaging system 2 can be adjusted to meet the mission requirements, it is desirable to provide a field of view which minimizes the distortion effects of relative movement between the space craft and the target at the desired mission altitude. The system 2 is mounted on the space craft in either a fixed or adjustable position. In the fixed position, alignment of the line of sight 4 of the image sensor 7 is accomplished solely by attitude adjustment. An adjustable mount can provide supplemental adjustment of the line of sight 4 to obtain alignment with the target 3. The position of the line of sight 4 is always known with respect to the reference coordinates of the space craft. The computer 10 is programmed with a predetermined mission attitude (x', y', z') at which the line of sight 4 is aligned with the target 3 during the image data collection process.

The ground receiving station 5 consists of tracking antennae 20 adapted to receive the image data signals and deliver the data signals to ground station computer 13. The ground station computer is programmed to process the image signals, compensating for distortion. Each image is identified relative to their location within the target 3 and then assembled into a composite mosaic of the complete target 3.

Ground station computer 13 utilizes advanced distortion reducing modeling algorithms such as those described in U.S. Pat. No. 4,688,092 to compensate for relative movement between the optical system 2 and the target 3. This allows the use of the less accurate GPS reference data system and eliminates the complex star sighting systems of the prior art. In prior art systems, each image was located by reference to the celestial data and then assembled. When the advanced algorithms are used, it has been found that the dominant cause of image distortion is the abrupt motion initiated by the attitude control system 8.

In the system of this invention ground station computer 13 is provided with a data base of known landmarks which are continuously compared to the image data received from the space craft 1. Each image is identified through the map coordinates of the known landmark and the position of the image relative to its contiguous image is established. Through the use of landmark recognition techniques as described in the '092 patent cited above, the image mosaic can be accurately assembled by the computer 13.

The image generation process is initiated by the on board computer 10 after the attitude of the space craft is adjusted so that the line of sight 4 is aligned for target interception and the position of the space craft is over the target. FIG. 2 shows the sweep of the image capture and illustrates how multiple passes or multiple space craft can obtain segments of the target image for assembly. For missions which are directed at specific targets of limited geography, the imaging system 2 is only activated for a short period of time. An imaging period of between 50 to 60 seconds would cover approximately 350 km on the ground if the space craft is orbiting at an altitude of 500 to 600 km.

Since the image capture process is only of limited duration, computer 10 is programmed to delay attitude adjustments while the imaging system 2 is activated. This prevents the distortion generating motions of the attitude control system 8 during image capture. During this period, the space craft 1 will drift from its mission attitude under the influence of solar torque and other factors, but the image processing algorithms of the ground computer 13 will compensate for this motion. The result is a high quality image with an overall system simplification.

What is claimed is:

1. An attitude and imaging control system for a space craft comprising:

image data generating means for generating images representative of a predetermined target during limited periods of relatively short duration when said target is in view mounted on the space craft, said image data generating means having a line of sight, said means adapted to generate a signal containing image data representing at least a partial target image, when said line of sight is aligned with the target and transmit said image signal to a ground receiving station;

an attitude control system mounted on the space craft and further comprising:

means mounted on the space craft to receive data indicative of the actual attitude and orbital position of the space craft and to generate a signal relative thereto;

computer means mounted on the space craft to process the position and attitude signal, and to compare said signal to predetermined data representative of the orbital position and attitude required to align the line of sight of the image generating means with the target, and to generate an attitude control adjustment signal indicative of the attitude adjustment required to align the line of sight with the target;

attitude control actuating means mounted on the space craft adapted to adjust the attitude of the space craft in response to the attitude control adjustment signal;

wherein said computer means disables said attitude control system during the operation of the image signal generating means to avoid attitude adjustment maneuvers which have an adverse effect on the image signal; and a ground receiving station adapted to receive the image signal and to transmit said signal to a receiving station computer, said receiving station computer comprising:

means for receiving and processing said signal to generate partial images of the target and identify said partial images relative to each other substantially independent of movement of the image generating means during image generation; and means to assemble said partial images into a composite of contiguous partial images representative of the complete target.

2. An attitude and imaging control system for a space craft as described in claim 1 wherein the means to identify said partial images relative to each other comprises landmark recognition from which the map coordinates of the partial images can be derived.

* * * * *